Patented Apr. 4, 1944

2,346,036

UNITED STATES PATENT OFFICE 2,346,036

BONDING OF METHACRYLATE POLYMERS

Richard E. Leary, Newark, N. J., assignor to E. I. du Pont de Nemours & Company, Wilmington, Del., a corporation of Delaware No Drawing. Application November 29, 1940, Serial No. 367,721

5 Claims. (Cl. 154—40)

This invention relates to liquid cements and, more particularly, to a liquid cement designed to cojoin pieces of cast methacrylate polymer, especially cast methyl methacrylate polymer.

Heretofore, a composition comprising methyl methacrylate polymer and one or more organic solvents such as toluene or chloroform, has been used for cojoining pieces of methyl methacrylate polymer. Monomeric methyl methacrylate containing a polymerization catalyst has also been used for this purpose. However, these cements have usually given rise to a weakening of the joint between the cemented pieces of polymer after a period of time and to a crazing of the cemented pieces of polymer. Moreover, the comparatively long time required for the hardening of monomeric methyl methacrylate compositions has been objectionable to their use as cements.

An object of this invention is to provide an improved cement for cojoining cast sheets, rods, tubes, and other shapes of methyl methacrylate polymers. A further object is to provide a cement which will produce a permanently strong joint between two or more pieces of cast methacrylate polymer, which will harden quickly, and which will not cause objectionable crazing. Other objects will be apparent from the description of the invention given hereinafter.

The above objects are accomplished according to the present invention by using a liquid composition comprising monomeric methacrylic acid as a cement for cojoining pieces of cast methacrylate polymer.

In accordance with this invention, a liquid cement comprising monomeric methacrylic acid is applied to at least one face of a piece of cast methacrylate polymer and then a second piece of cast methacrylate polymer is placed in contact with the coated surface of the first piece and the two pieces are then maintained in contact with each other until they are strongly bonded together. Preferably, the face of the second piece of cast polymer contacting the first piece of cast polymer is likewise coated with the liquid cement.

While the precise action of the methacrylic acid in effecting a bond between two pieces of cast methacrylate polymer is in some doubt, it probably is due, to a large extent, to the solvent action of the monomeric methacrylic acid on the pieces of cast polymer and the polymerization of the methacrylic acid. Regardless of the explanation, the result is that, in a short time, a strong and permanent bonding of the pieces of cast polymer is obtained without any appreciable crazing.

The cement of the present invention may consist entirely of methacrylic acid but it is preferred to use a composition comprising methacrylic acid with methyl methacrylate polymer dissolved therein. Any quantity of methyl methacrylate polymer may be used up to that amount which gives with the monomeric methacrylic acid a mixture that ceases to be a liquid. However, it has been found advantageous to use approximately 1%–5%, by weight of the methacrylic acid, of methyl methacrylate polymer. Inhibitors or polymerization catalysts may be included in the cement composition.

The following examples in which all parts are given by weight, illustrate specific cement compositions according to the present invention.

Example I

| | Parts |
|---|---|
| Monomeric methacrylic acid | 100 |

Example II

| | Parts |
|---|---|
| Monomeric methacrylic acid | 99 |
| Benzoyl peroxide | 1 |

Example III

| | Parts |
|---|---|
| Monomeric methacrylic acid | 98 |
| Polymethyl methacrylate | 2 |

Example IV

| | Parts |
|---|---|
| Monomeric methacrylic acid | 95 |
| Polymethyl methacrylate | 4 |
| Benzoyl peroxide | 1 |

Example V

| | Parts |
|---|---|
| Monomeric methacrylic acid | 80 |
| Polymethyl methacrylate | 20 |

It will be understood that the above examples are merely illustrative and that the proportions of ingredients used may be varied over a wide range. Also, other polymerization catalysts may be used in place of benzoyl peroxide or inhibitors may be included.

While it is usually unnecessary to apply force to the pieces being cemented other than that required to maintain the pieces in close contact, the use of additional pressure and the application of heat, which latter increases the rate of hardening of the cement, may be employed.

The present invention is particularly adapted for cojoining pieces of cast methyl methacrylate polymer but it is broadly applicable to cojoining pieces of any cast methacrylate polymer such as polymers of other esters of methacrylic acid and interpolymers of esters of methacrylic acid with one another or with minor proportions of other polymerizable compounds, with or without the addition of plasticizers, modifiers, coloring matter, and effect materials, and the like.

It has been pointed out that the cements of the prior art for cojoining cast sheets, rods, and tubes of methyl methacrylate polymer give rise to weakening of the bond after a period of time and to crazing of the cemented material, particularly when used with resin which has not received sufficient heat treatment to remove all surface strains. This crazing has been so troublesome that the development of other aspects of the art has been retarded thereby. Cements containing monomeric methyl methacrylate are further objectionable in that the time required for the setting of the cement is too long to make extended commercial use feasible.

The cements of the present invention form permanently strong bonds between pieces of cast methyl methacrylate polymer. There is no tendency to crazing, even when the material cemented has not received sufficient heat treatment to completely remove all surface strains. Cements comprising monomeric methacrylic acid harden quickly, and the joints so formed are weather resistant and are not affected by long periods of immersion in water.

As many apparently widely different embodiments of this invention may be made without departing from the spirit and scope thereof, it is to be understood that the invention is not limited to the specific embodiments thereof except as defined in the appended claims.

I claim:

1. An article comprising two pieces of cast methacrylate polymer cojoined by the cementing action of monomeric methacrylic acid.

2. An article comprising two pieces of cast methyl methacrylate polymer cojoined by the cementing action of a liquid cement comprising a solution of methyl methacrylate polymer in monomeric methacrylic acid.

3. Process comprising coating a surface of a piece of cast methacrylate polymer with a liquid cement comprising monomeric methacrylic acid, placing a second piece of cast methacrylate polymer in contact with the coated surface of said first piece, and maintaining said pieces in contact with each other until strongly bonded together by said cement.

4. Process comprising coating a surface of a piece of cast methyl methacrylate polymer with a liquid cement comprising monomeric methacrylic acid, a polymerization catalyst therefor, and 1%–5%, by weight of said methacrylic acid, of methyl methacrylate polymer dissolved therein, placing a second piece of cast methyl methacrylate polymer in contact with the coated surface of said first piece, and maintaining said pieces in contact with each other until strongly bonded together by said cement.

5. Process comprising coating a surface of each of two pieces of cast methyl methacrylate polymer with a liquid cement comprising monomeric methacrylic acid, a polymerization catalyst therefor, and 1%–5%, by weight of said methacrylic acid, of methyl methacrylate polymer dissolved therein, placing said pieces with their coated faces juxtaposed in contact with each other, and maintaining said pieces in such position until said pieces are strongly bonded together by said cement.

RICHARD E. LEARY.